US012746801B2

(12) United States Patent
Mourou et al.

(10) Patent No.: US 12,746,801 B2
(45) Date of Patent: Sep. 29, 2026

(54) DISPLAY SYSTEMS RELEASABLY ATTACHED TO A WINDSHIELD ASSEMBLY AND PROCESSES THEREOF

(71) Applicant: GM GLOBAL TECHNOLOGY OPERATIONS LLC, Detroit, MI (US)

(72) Inventors: Julien P. Mourou, Bloomfield Hills, MI (US); Guy N. Kennerly, Southfield, MI (US); Thomas A. Seder, Fraser, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 559 days.

(21) Appl. No.: 18/364,877

(22) Filed: Aug. 3, 2023

(65) Prior Publication Data

US 2025/0042230 A1 Feb. 6, 2025

(51) Int. Cl.
*B60J 1/06* (2006.01)

(52) U.S. Cl.
CPC ........................................ *B60J 1/06* (2013.01)

(58) Field of Classification Search
CPC ............. B60R 11/0229; B60R 11/0235; B60R 2011/0042; B60R 2011/005
(Continued)

(56) References Cited

U.S. PATENT DOCUMENTS 3,313,053 A * 4/1967 Vogeli, Sr. ................ G09F 3/18 40/643
3,533,178 A * 10/1970 Strohmaier ............. B60R 13/10 40/643

(Continued)

FOREIGN PATENT DOCUMENTS

CN 113655621 A * 11/2021 ......... G02B 27/0149
CN 117246251 A * 12/2023 ......... B60R 11/0229

(Continued)

OTHER PUBLICATIONS

Regulation No. 125 https://unece.org/sites/default/files/2024-07/R125r3e.pdf (Year: 2017).*
Informal document No. GRSG-99-10 https://unece.org/DAM/trans/doc/2010/wp29grsg/GRSG-99-10e.pdf (Year: 2010).*
Rahco Rubber, Inc. https://rahco-rubber.com/resources/elastomer-hardness-selection/ (Year: 2026).*

*Primary Examiner* — Hilary L Gutman
(74) *Attorney, Agent, or Firm* — CANTOR COLBURN LLP

(57) ABSTRACT

Automotive vehicles include a display system releasably attached to the interior facing curved glass surface of a front windshield assembly. The front windshield assembly includes at least two spaced apart rigid pins adhesively bonded thereto. The display system includes a rigid bracket including a keyhole portion configured for sliding engagement with the at least two pins. A display such as a non-transparent display, a transparent display, or a heads-up display can be mounted to the bracket. A decorative covering overlies the rigid bracket in its entirety and can be readily removed to provide access for release of the rigid bracket from the at least tow pins. The front windshield can further include a closeout formed of a compressible thermoplastic elastomer configured to compress upon sliding engagement of the rigid bracket with the at least two pins and form a sealed cavity to prevent dust, debris and moisture from entering.

20 Claims, 9 Drawing Sheets

(58) Field of Classification Search
USPC .......................................................... 296/84.1
See application file for complete search history.

(56) References Cited

U.S. PATENT DOCUMENTS

| | | | | | |
|---|---|---|---|---|---|
| 4,184,276 | A * | 1/1980 | Hernandez | G09F 1/10 | 40/644 |
| 4,896,855 | A * | 1/1990 | Furnish | B60R 11/02 | 248/206.3 |
| 5,020,754 | A * | 6/1991 | Davis | F16B 47/00 | 248/205.8 |
| 5,131,177 | A * | 7/1992 | Sy, Jr. | B60R 13/10 | 40/591 |
| 5,502,912 | A * | 4/1996 | LeBoff | G09F 21/04 | 40/643 |
| 5,695,164 | A * | 12/1997 | Hartmann | F16M 11/10 | 248/316.4 |
| 5,850,957 | A * | 12/1998 | Morris | B60R 11/00 | 224/555 |
| 5,905,477 | A * | 5/1999 | Kuwayama | B60R 11/0235 | 359/13 |
| 5,960,572 | A * | 10/1999 | DeVito | G09F 7/18 | 40/643 |
| 6,446,375 | B1 * | 9/2002 | Davis | G09F 3/203 | 40/591 |
| 6,452,507 | B1 * | 9/2002 | Friedman | G07B 15/06 | 40/643 |
| D477,909 | S * | 8/2003 | Harris | D3/247 | |
| 6,658,775 | B1 * | 12/2003 | Lanzisero | G09F 3/203 | 40/605 |
| 7,080,764 | B2 * | 7/2006 | McNicholas | B60R 11/02 | 224/482 |
| 8,256,821 | B2 * | 9/2012 | Lawlor | B60R 11/04 | 296/37.8 |
| 8,514,059 | B2 * | 8/2013 | Centner | G06K 19/07345 | 248/205.5 |
| 9,623,801 | B2 * | 4/2017 | Jeon | B60R 1/12 | |
| 10,232,798 | B2 * | 3/2019 | Gunes | H04N 13/239 | |
| D993,889 | S * | 8/2023 | Kang | D12/415 | |
| 2004/0245302 | A1 * | 12/2004 | McNicholas | B60R 11/02 | 224/482 |
| 2014/0291369 | A1 * | 10/2014 | Marsilla | B60R 11/00 | 224/482 |
| 2018/0011320 | A1 * | 1/2018 | Chen | G02B 27/0149 | |
| 2024/0263975 | A1 * | 8/2024 | Schuiling | C08L 67/02 | |

FOREIGN PATENT DOCUMENTS

| | | | | |
|---|---|---|---|---|
| CN | 118438960 | A * | 8/2024 | B60J 1/02 |
| DE | 60001560 | T2 | 11/2000 | |
| DE | 69913974 | T2 | 2/2004 | |
| DE | 112015000295 | T5 | 9/2016 | |
| DE | 102025106540 | A1 * | 8/2025 | B60K 35/656 |
| GB | 2170281 | A * | 7/1986 | F16J 15/027 |
| JP | 4117039 | B2 * | 7/2008 | |
| JP | 4472272 | B2 * | 6/2010 | |
| KR | 102411046 | B1 * | 6/2022 | B60W 40/02 |

* cited by examiner

DISPLAY SYSTEMS RELEASABLY ATTACHED TO A WINDSHIELD ASSEMBLY AND PROCESSES THEREOF

INTRODUCTION

The subject disclosure relates to display systems for releasable attachment to a vehicle windshield assembly, which provides serviceability, aesthetics, mitigation of condensation, and the like.

Current display systems inside a vehicle are generally located in a dashboard below the front windshield for displaying speed, engine rpm, fuel consumption, tire pressure and so on. In addition, many vehicles include a multi-functional center console display, which can include functions providing entertainment, navigation, and the like. Like the dashboard display, the central console display is also located below the front windshield. As such, the driver often needs to move his sight line away from the region of the front windshield, resulting in a potential distraction.

Moreover, the current dashboard and/or center console locations for the various display systems are typically permanently attached to the vehicle sub-structure, which makes service access and/or replacement of the electronics driving the display systems as well as the displays themselves very difficult. Oftentimes service of the display system requires complete disassembly of the dashboard and/or center console in order to access the display system and assess the repair or replacement requirements, which can require specialized skill.

Accordingly, it is desirable to provide a display system that is serviceable, readily accessible and/or replaceable, and can be easily integrated with vehicle assembly.

SUMMARY

In one exemplary embodiment, an automotive vehicle includes a front windshield assembly including at least two spaced apart rigid pins adhesively bonded to an interior-facing curved glass surface. Each of the at least two spaced apart rigid pins includes a bottom planar surface substantially coplanar with the interior facing glass surface, and a stem portion extending from the bottom planar surface to a terminal head portion. The front windshield assembly further includes a closeout injection molded onto the interior-facing curved glass surface formed of a compressible thermoplastic elastomer. A display system releasably attached to the interior facing glass surface includes a display mounted to a rigid bracket. The rigid bracket includes flanges extending outwardly relative to the mounted display on each side thereof. The flanges include a keyhole-shaped opening including an opening portion and a slot opening portion configured for sliding engagement and disengagement of the rigid bracket to the at least two spaced apart rigid pins. The injection molded closeout compresses upon sliding engagement of the rigid bracket to the at least two spaced apart rigid pins to form a sealed cavity between the mounted display and the interior facing glass surface.

In addition to one or more of the features described herein, the injection molded closeout can be formed of a thermoplastic elastomer having a Shore hardness equal to or less than about 50 and the rigid bracket can be formed of a thermoplastic having a Shore hardness of equal to or greater than about 75. The closeout compresses at least 25 percent upon the sliding engagement of the rigid bracket. In ones or more aspects, the sealed cavity prevents dust, debris, and moisture from entering the sealed cavity. In one or more other aspects, the flanges include a molded snap fit feature including a flexible portion overlying the opening portion of the keyhole opening, wherein the flexible portion is configured to upwardly flex upon insertion of the terminal head portion of the pin. The rigid bracket can be slidingly engaged with and lockingly engaged at a detent position at a terminal end of the slot opening portion and slidingly disengaged from the at least two pins upon upward flexure of the molded snap fit feature and sliding engagement of the bracket away from the terminal end to the opening portion. The display mounted to the rigid bracket can include a non-transparent display, a transparent display or a heads-up display. The opening portion and the slot opening portion of the keyhole-shaped opening have dimensions equal to or slightly larger than dimensions of the terminal head portion and the stem portion, respectively. The releasable display system is located below a 5-degree downward line extending forward from a driver eye reference geometry defined by the V points and E points according to Economic Commission for Europe (ECE) Regulation No. 125. In one or more aspects, the releasable display system further comprises a decorative outer cover snap fit to the rigid bracket and overlying the rigid bracket in its entirety, the decorative outer cover including an opening for viewing the display mounted to the rigid bracket.

In another exemplary embodiment, an automotive vehicle includes a front windshield assembly including an exterior-facing curved glass surface and an interior-facing curved glass surface, wherein the interior-facing curved glass surface includes at least two pins adhesively bonded to the interior-facing curved glass surface. Each of the at least two pins includes a bottom planar surface coplanar with the interior facing glass surface, and a stem portion extending from the bottom planar surface to a terminal head portion. A closeout is injection molded onto the interior facing glass surface formed of a compressible thermoplastic elastomer. A display system releasably attached to the interior facing curved glass surface includes a display mounted to a rigid bracket. A decorative housing overlies the rigid bracket in its entirety. The rigid bracket includes flanges extending outwardly relative to the mounted display on each side thereof, wherein the flanges include a keyhole-shaped opening. The keyhole-shaped opening includes an opening portion configured to accommodate dimensions of the terminal head portion of the pin and a slot opening portion configured to accommodate dimensions of the stem portion. A molded snap fit feature including a flexible portion overlies the opening portion and is configured to upwardly flex upon insertion of the terminal head portion of the pin, wherein the rigid bracket can be slidingly and lockingly engaged in the keyhole opening at a detent position at a terminal end of the slot opening portion. The rigid bracket can be slidingly disengaged from the at least two pins upon manual upward flexure of the molded snap fit feature and sliding engagement of the rigid bracket away from the terminal end to the opening portion.

The at least two pins function as datums for releasable attachment of the rigid bracket during assembly and for injection molding of the closeout onto the interior facing glass surface. The molded snap feature includes a notched end configured to lockingly engage the terminal head portion at the detent position when the pin is at the terminal end of the slot opening portion. In one or more aspects, the mounted display is raised relative to the flanges. The compressible thermoplastic elastomer includes a Shore hardness equal to or less than 50 and the rigid bracket includes a Shore hardness equal to or greater than about 75. The closeout compresses at least 25 percent upon engagement of the rigid bracket with the at least two pins. The closeout and the rigid bracket can have shapes effective to form a sealed cavity to prevent dust, debris and moisture from entering therein upon compressive engagement of the rigid bracket with the closeout. In one or more aspects, the rigid bracket includes vents and the display is programmed to power on and release heat onto the interior facing glass surface about the display system upon detection of a condensation condition. The decorative housing overlying the rigid bracket is snap fit to the rigid bracket and is removable relative to the rigid bracket. The display system is located below a 5-degree downward line extending forward from a driver eye reference geometry defined by the V points and E points according to Economic Commission for Europe (ECE) Regulation No. 125.

In yet another exemplary embodiment, a process of releasably attaching a display system to a front windshield assembly includes bonding at least two metal or plastic datum retention features onto an interior facing glass surface of the front windshield assembly. The display system is releasably attached to the datum retention features, wherein the display system includes a rigid bracket including flanges outwardly extending on each side of a display mounted to the rigid bracket. each of the flanges includes a keyhole-shaped opening including an opening portion, a slot opening portion, and a molded snap fit feature overlying the opening portion. Releasably attaching the display system includes lockingly engaging the datum retention features at a detent position at a terminal end of the slot opening portion upon engagement with the molded snap fit feature; and releasing the display system including upward flexure of the molded snap fit feature and sliding engagement of the rigid bracket away from the terminal end of the slot opening portion to the opening portion, wherein the rigid bracket can be completely disengaged from the retention features.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
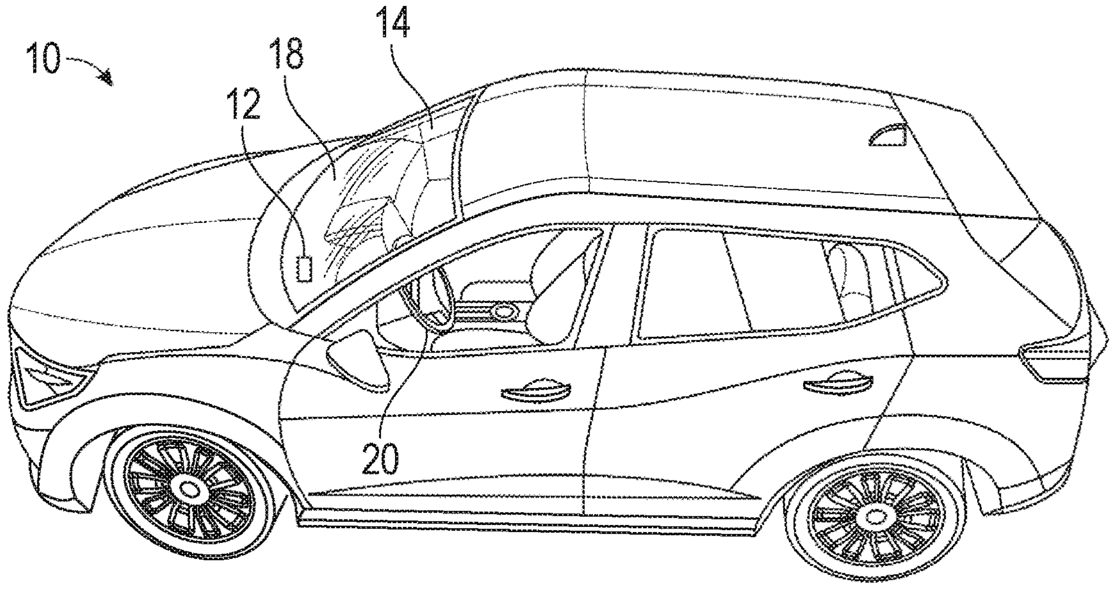
FIG. 1 is a perspective view of a vehicle including a display system in accordance with one or more embodiments of the present disclosure.

The following description is merely exemplary in nature and is not intended to limit the present disclosure, its application or uses. It should be understood that throughout the drawings, corresponding reference numerals indicate like or corresponding parts and features.

In accordance with an exemplary embodiment, disclosed herein are display systems removably attached via a bracket fixedly bonded to a vehicle windshield to provide improved access and serviceability for the display systems, and ease in replacement, if needed.

Windshields are generally formed of laminated glass structures including a laminating layer such as polyvinyl butyral, ethylene-vinyl acetate, ionoplast plastics, thermoplastic polyurethane, and the like, between two sheets of tempered glass, i.e., glass panels.

The laminated glass structure provides the windshield with some flexibility. An opaque plastic, ceramic, ceramic-metal or metal frame is often formed about the periphery of the laminate windshield structure for attachment to the vehicle. As will be described in greater detail, the display system is removably attached to the vehicle windshield via the bracket at a lower portion of the windshield such that the display system can sit on the dashboard, albeit unattached directly to the dashboard. In one or more embodiments, a display in the display system is positioned below about a 5-degree downward line extending forward from a driver eye reference geometry defined by the V points and E points according to Economic Commission for Europe Regulation No. 125. As cited in the ECE-Regulation No. 125, "V points" means points whose position in the passenger compartment is determined as a function of vertical longitudinal planes passing through the centres of the outermost designated seating positions on the front seat and in relation to the "R" point and the design angle of the seat-back, which points are used for verifying compliance with the field of vision requirements. As cited in the ECE Regulation No.

125, "E points" means points representing the centres of the driver's eyes and used to assess the extent to which "A" pillars obscure the field of vision. Positioning the display system below this visibility boundary allows the display to remain visible to the driver while avoiding obstruction of the regulated forward field of vision through the windshield. The angle of the data plane provided by the viewable display portion of the display when mounted onto the windshield is different from that of the angle of the windshield so that the driver and/or passenger(s) can readily view any information provided by the display, i.e., the angle of plane for the display is closer to being perpendicular relative to the ground than the windshield angle.

Once the display system is mounted to the bracket, the display system is configured to provide a seal between the bracket and the windshield via a closeout material to prevent dust, debris, water, and other contaminants from accumulating in any space between the display system and the windshield. Moreover, the display system and bracket can be configured to aesthetically closeout to the opaque portion of the windshield, which is often referred to as the mask about a periphery of the windshield. Still further, when in use, the display system can be utilized to provide a heat source to mitigate condensation onto the windshield by utilizing residual heat from operation of the display. In one or more embodiments, the control system of the vehicle can be configured to automatically actuate the display system to cause an increase in temperature on an interior surface of the windshield effective when the control system detects a potential condensation condition based on detected interior and exterior environmental conditions, (e.g., temperature, humidity, and the like). The display system is not intended to be limited and can include a transparent or non-transparent micro-LED display or a projection display for providing a heads-up display (HUD) on the windshield.

A micro-LED display is a type of display technology that generally includes an array of tiny light emitting diode (LED) chips, each measuring only a few microns in size, that emit light when an electric current is applied to them via positive and negative wires in electrical communication with the circuits driving the LED chips to produce high-resolution images and videos. A transparent micro-LED display technology works by using transparent conductive layers that are sandwiched between the LED chips and the substrate. These layers provide the necessary electrical connections to the LED chips while also allowing light to pass through them. The result is a display that can display vivid images while also allowing the viewer to see through the display. In contrast, non-transparent micro-LED displays are typically mounted on a rigid non-transparent substrate, such as a glass or plastic panel, and are connected to electronic circuits that control their operation. As for heads-up displays (HUD), these types of displays projects information such as speed, navigation instructions, vehicle warning messages, and the like, onto the windshield with the images typically projected within the driver's line of sight. The HUD works by using a projector that projects an image onto a specially designed reflective surface provided on the windshield. This surface reflects the image back to the driver, who sees the information as if it were floating in front of them. HUDs are designed to help drivers keep their eyes on the road and minimize distractions. By displaying information directly in the driver's line of sight, HUDs allow drivers to quickly and easily access the information without taking their eyes off the road.

The terms "a" and "an" do not denote a limitation of quantity, but rather denote the presence of at least one of the referenced items. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

Turning now to FIG. 1, there is depicted a perspective view of a vehicle generally designated by reference numeral 10 including a display system 12 removably attached to a front windshield assembly 14 of the vehicle 10. As will be described in greater detail below, the display system 12 can be a transparent or non-transparent micro-LED display system or a heads-up reflective display system configured to provide digital information to the driver and/or passenger(s) of the vehicle. The display system 12 can be powered by positive and negative wires (not shown) in electrical communication with a circuit driving the LEDs as known in the art. Direct current can be utilized to power the display system via a control system (not shown). The display system 12 can be used in addition to or to replace a multi-gauge instrument cluster mounted in a dashboard 18 immediately above a steering wheel 20 attached to a steering column (not shown), wherein the dashboard 18 is generally located below the 1-degree line as specified in Economic Commission for Europe Regulation No. 1125 (ECE line). The display system 12 can be removably attached to the windshield assembly 14 at a location below about a 5-degree ECE line.

Figure 2:
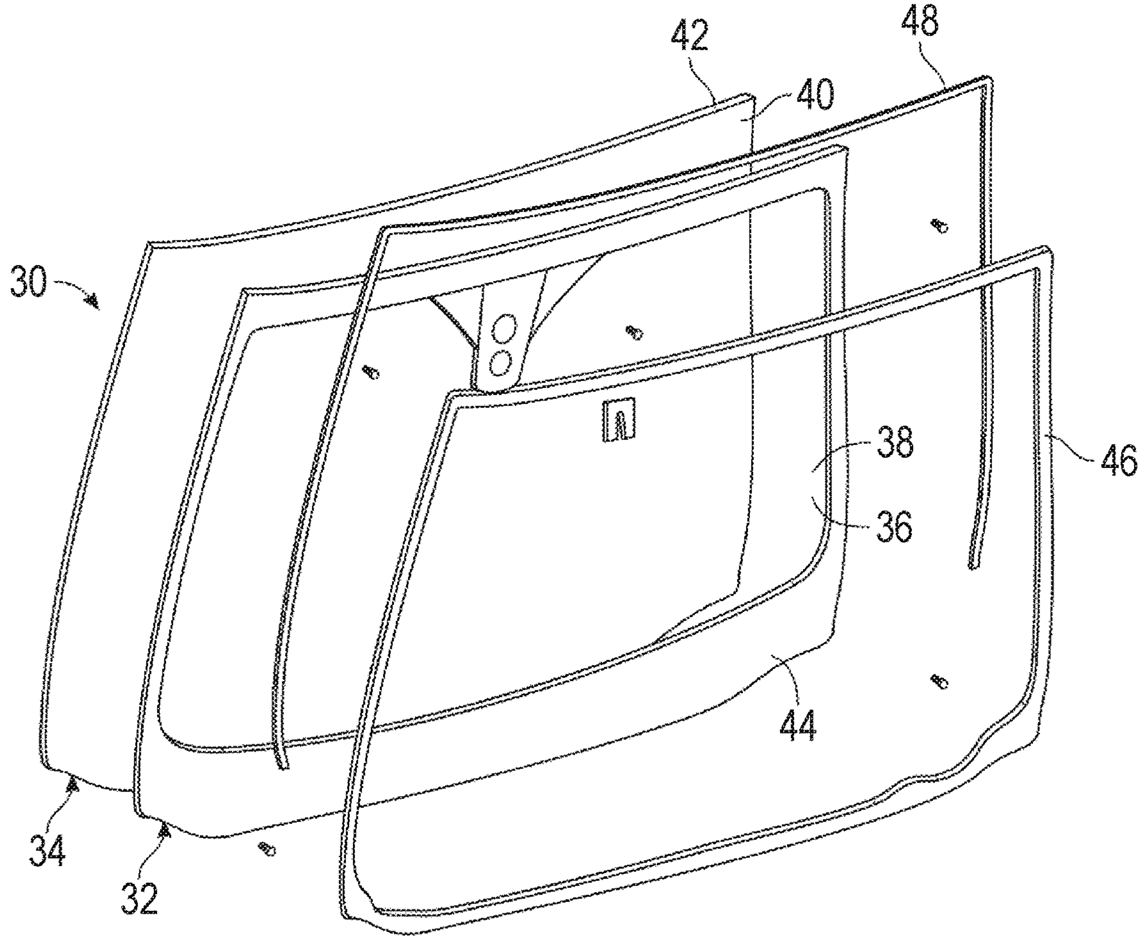
FIG. 2 is a disassembled view of an exemplary windshield assembly.

In FIG. 2, there is depicted a disassembled perspective view of an exemplary windshield assembly 30 suitable for use in the present disclosure. The windshield assembly 30 includes a first curved exterior glass panel 32 and a second curved interior glass panel 34 laminated together using a laminating material (not shown) such as polyvinyl butyral or ethylene vinyl acetate under heat and pressure. The first curved exterior glass panel 32 includes an exterior facing surface 36 and an inner facing surface 38. Likewise, the second curved interior glass panel 34 includes an inner facing surface 40 and an interior facing glass surface 42. It should be apparent that the term "inner facing" refers to the opposing glass surfaces 38, 40 in direct contact with the laminating material.

A selected one of the inner facing surfaces 38 or 40 can include an opaque frit material 44 formed of a ceramic, ceramic-metal or metal applied to a perimeter thereof, (e.g., inner facing surface 38 as shown). The opaque frit material 44 can be characterized as a black enamel-like substance that once applied serves as a barrier against elements, preventing moisture and dirt from entering the laminate via the windshield edges and also serves to create a clean finished look. Some windshield assemblies may further include sensors and/or accessories (not shown) embedded within the laminated windshield 30.

A metal framing 46 is provided around the laminated first and second glass panels 32, 34, which is typically made of steel, aluminum, or other strong and durable metals. The metal framing 46 includes several parts used to secure the laminated glass panels to a corresponding opening in the vehicle. The windshield assembly can further includes a weatherstrip or rubber molding 48 about at least a portion of the metal framing 46 to prevent water from entering the vehicle and is often designed to channel water away from the windshield and into the vehicle's drainage system.

The resulting windshield frame assembly 30 is placed into a corresponding framed opening (not shown) in the vehicle, and a polyurethane adhesive is applied to the frame and the windshield assembly's edges. The windshield assembly 30 is then pressed into place and held there until the adhesive dries and sets. Once the adhesive has cured, the excess adhesive is trimmed away, and the exterior facing surface 36 of the first curved exterior glass panel 32 and the interior-facing glass surface 42 of the second curved exterior glass panel 34 are cleaned and inspected for any defects or damage. As will be described in greater detail below, the windshield assembly 30 further includes a pair of spaced apart rigid pins (see FIG. 3, pins 50, 52) on the interior facing surface 42 of the second curved glass surface 34 for releasable engagement with a bracket for the display system 12.

Figure 3:
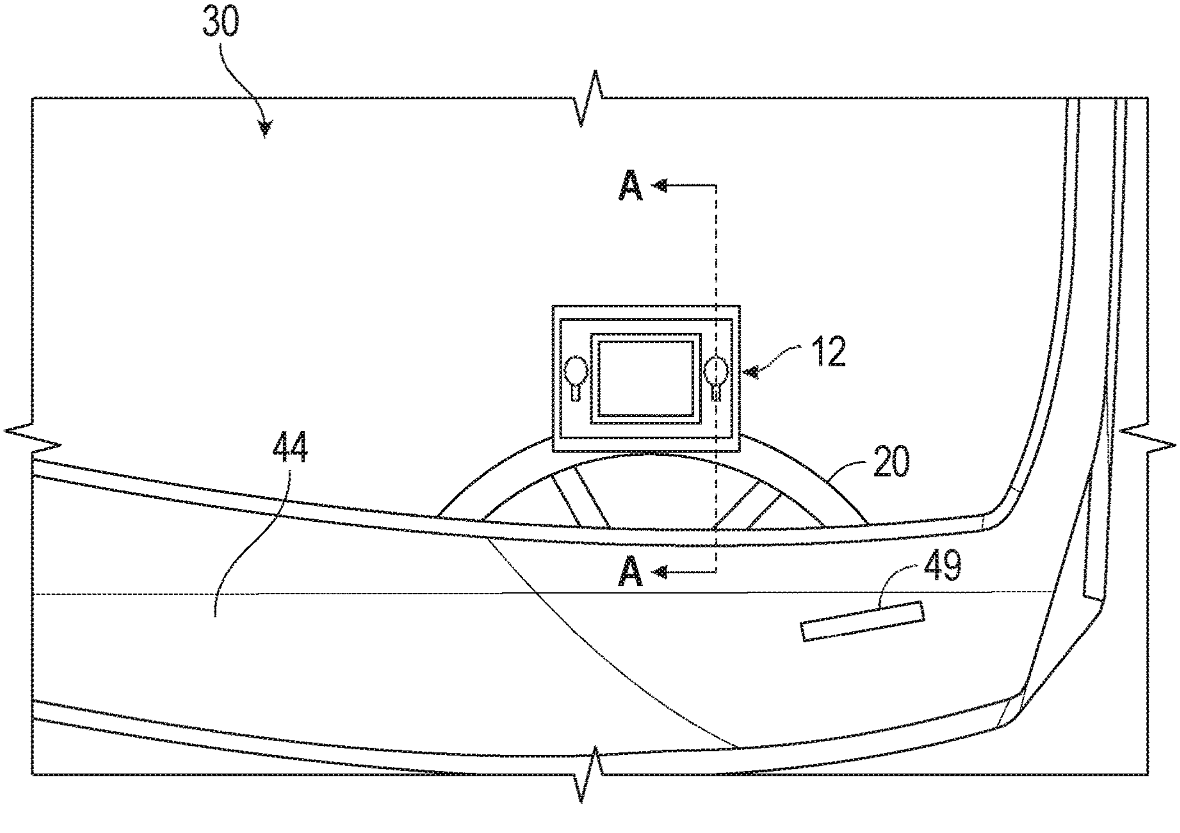
FIG. 3 is a partial front perspective exterior view of a vehicle including a display system in accordance with one or more embodiments of the present disclosure.

FIG. 3 illustrates a partial front perspective exterior view of the front windshield assembly 30 looking into the vehicle depicting the display system 12 attached thereto and positioned above the steering wheel 20 below the 5-degree downward line extending forward from a driver eye reference geometry defined by the V points and E points according to the ECE Regulation No. 125. As shown, the opaque frit material 44 circumscribes a perimeter portion of the windshield assembly 30, which can also include transparent portions 49 that do not include the opaque frit material 44; such as may be desired to provide visible access to an underlying vehicle identification number permanently attached to the vehicle or the like.

Figure 4:
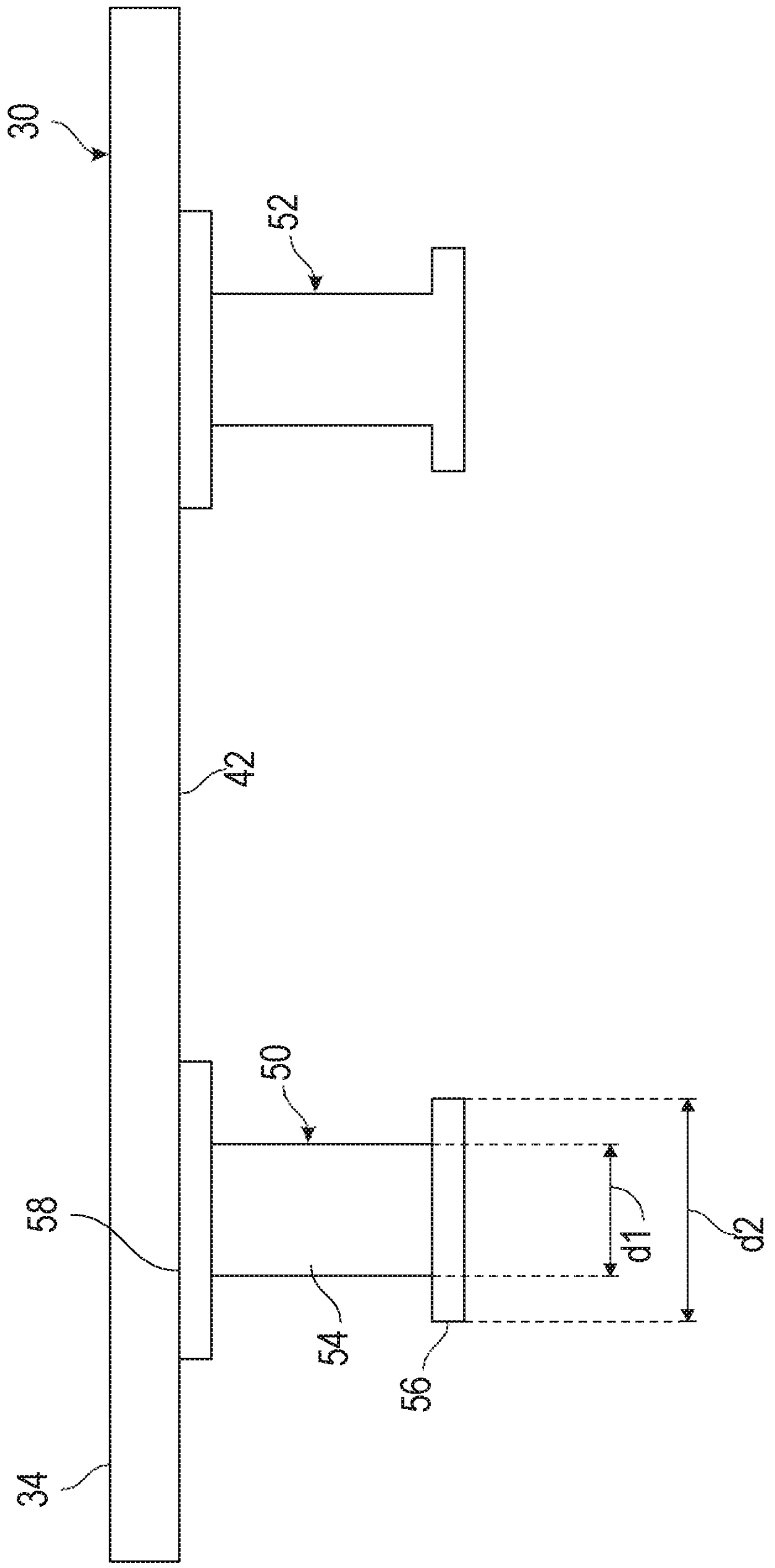
FIG. 4 is a sectional view of the windshield assembly including pins adhesively bonded to an interior facing glass surface in accordance with one or more embodiments of the present disclosure.

FIG. 4 illustrates a top-down sectional view taken along a plane of the windshield glass assembly 30 according to the present disclosure including at least two spaced apart rigid pins 50, 52 adhesively bonded to the interior facing surface 42 of the windshield assembly 30 at precise locations, which also serve as datums for subsequent releasable attachment of the display system 12 to the windshield assembly 30. The at least two spaced apart pins 50, 52, also referred to herein as retention features, can be fixture located or robotically placed at the precise locations of the interior facing glass surface 42 of the windshield assembly 30. Although reference will be made to two pins 50, 52 for convenience and ease in understanding the present disclosure, additional pins can be used for attachment of an elongated display system that could longitudinally extend across a substantial portion of or extend across the complete windshield glass assembly 30, (e.g., from a driver side A pillar to a passenger side A pillar of the vehicle as may be desired for different applications). The length of the display system 12 is not intended to be limited. Moreover, although the pins 50, 52 are generally located above a steering wheel 20, the pins 50, 52 and the releasably attached display system 12 can be placed at any location on the windshield assembly 30 so long as the display system is below the 5-degree downward line extending forward from a driver eye reference geometry defined by the V points and E points according to the ECE Regulation No. 125, to comply with the forward field of vision requirements.

Each pin 50 and 52 can be of the same dimensions and includes a stem portion 54 and a head portion 56 at a terminal end thereof, wherein the stem portion 54 includes a planar bottom surface 58 adhesively bonded to the interior facing glass surface 42. The stem portion 54 has a diameter d1. The planar bottom surface 58 can be of the same diameter or larger diameter than the stem portion 54 having a shape suitable to provide a greater surface area of adhesive attachment to the interior facing glass surface 42. The head portion 56 can be circular having a diameter d2, wherein diameter d2 is greater than diameter d1 for the stem portion 54. The pins 50, 52, can be a monolithic structure formed of a rigid material such as a metal, plastic, or the like. The windshield assembly 30 further includes a closeout 62 (see, for example, FIG. 5, closeout 62) formed of a relatively soft thermoplastic elastomer on the interior facing surface 42 of the windshield assembly 30, which will be described in greater detail herein.

Turning now to FIGS. 5-9, various views of a non-transparent display system 60 are depicted for releasable attachment to the windshield assembly 30, wherein the non-transparent display system 60 includes a reflective display 66.

Figure 5:
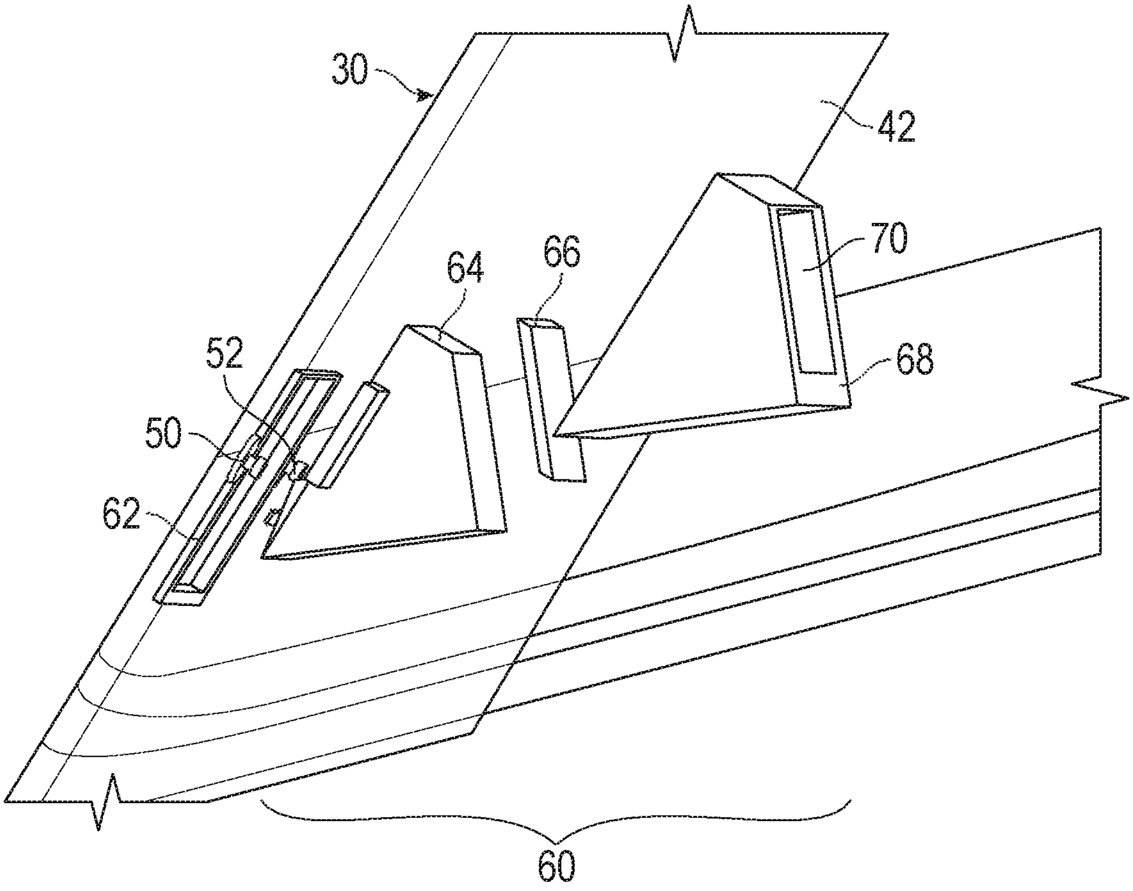
FIG. 5 is a disassembled side perspective view of a non-transparent display system releasably attached to a windshield assembly in accordance with one or more embodiments of the present disclosure.

In FIG. 5, a disassembled perspective view of the non-transparent display system 60 releasably attached to the pins 50, 52 bonded to the windshield assembly 30 is shown. The non-transparent display system 60 generally includes a bracket 64 for releasable engagement with the pins 50, 52; a non-transparent reflective micro-LED display 66 mounted to the bracket 64; and a housing 68 overlying the bracket 60 and pins 50, 52 in their entirety including an opening 70 for visual access to the non-transparent micro-LED display 66 in use. The non-transparent display system 60 is generally positioned over a dashboard hood below the 5-degree downward line extending forward from a driver eye reference geometry defined by the V points and E points according to the ECE Regulation No. 125. As noted above, the windshield assembly 30 includes a closeout 62 provided thereon having a shape complementary to a contact surface of the bracket 64 when attached to the pins 50, 52. The closeout 62 can be injection molded directly onto the interior facing surface 42 during manufacture of the windshield assembly 30, wherein the pins 50, 52 can serve as datums for precise location of the closeout.

The bracket 64 is formed of a rigid plastic, which can be fiber reinforced, having a Shore hardness equal to about 75 A or greater. When the bracket 64 is releasably attached to the pins 50, 52, the bracket 64 compresses the closeout 62 at the contact surfaces by at least 25 percent, which effectively seals the bracket 64 against the closeout 62 such that a cavity defined by the structure of the bracket 64 is effectively sealed when attached to the windshield assembly 30.

Advantageously, the sealing engagement of the bracket 64 to the closeout 62 prevents moisture, dust, debris or the like from entering the cavity behind the display 66 when the non-transparent display system 60 is attached to pins 50, 52 via bracket 64. Additionally, the closeout 62, being formed of the compressible thermoplastic elastomer, can compensate for variations in the curvature of the interior facing surface 42 and still provide an effective seal.

The housing 68 can be releasably attached to the bracket 64 and is formed of a thermoplastic olefin that is generally decorative and serves to cover the bracket 64. The housing 68 can be configured to snap fit to the bracket 64 and be readily removed as needed to provide access to the releasable mechanism for the bracket 64 as will be described in greater detail herein. As such, the non-transparent display system 60 can be installed by an automotive manufacturer during vehicle assembly yet be readily serviced by an automotive dealer or service person given its releasable attachment of the bracket 64 to the pins 50, 52 and the readily removable housing 68 to access the bracket release mechanism. In one or more other embodiments, the housing 68 and optionally the bracket 64, if needed, can further include vents (not shown) such that the increase in heat from operating the non-transparent display system 60 can be directed to warm the interior facing surface 42 of the windshield assembly 30 at locations above the 5-degree line. As such, the non-transparent display system 60 can be programmed to actuate and generate heat upon detection of potential condensation conditions to prevent condensation from occurring.

Figure 6:
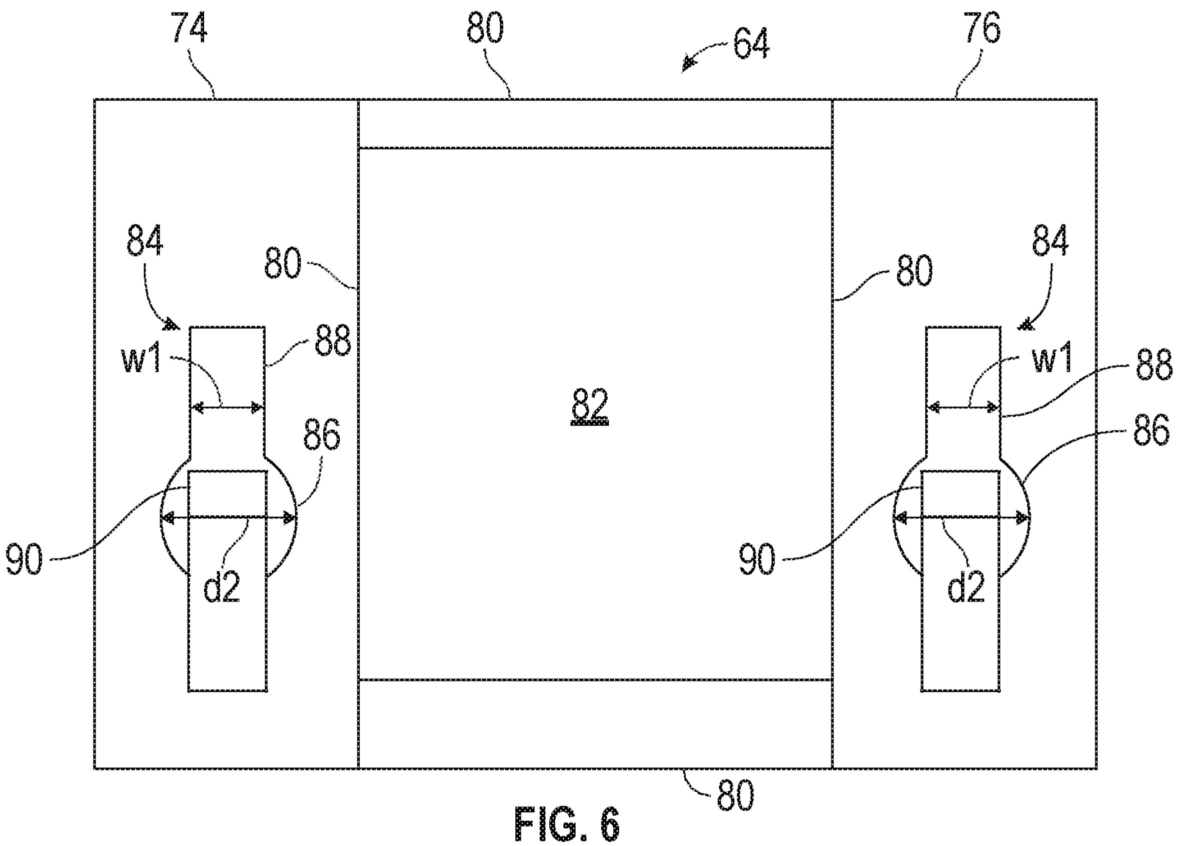
FIG. 6 is a front sectional view of a bracket for the non-transparent display system of FIG. 5 in accordance with one or more embodiments of the present disclosure.

FIG. 6 is a top plan view of the bracket 64 for the non-transparent display system 60. The bracket 64 includes first and second outwardly extending flanges 74, 76 having surfaces substantially coplanar to the interior facing surface 42 of the windshield assembly 30 when releasably attached thereto and a housing portion defined by sidewalls 80 perpendicularly extending from the flanges 74, 76 and a planar surface 82 extending between the sidewalls 80 that collectively form a cavity behind the non-transparent display 66. The planar surface 82 is raised relative to the flanges 74, 76, wherein the resulting cavity can be utilized for the electronics associated with actuating the non-transparent display 66. The flanges 74, 76 extend outwardly relative to the sidewalls 80 on each side of the bracket 64. The planar surface 82 can further include means for coupling the non-transparent display 66 to the planar surface 82. For example, the planar surface 82 can be recessed (not shown) relative to sidewalls 80 to accommodate dimensions of the non-transparent display 66 and subsequent attachment to the planar surface 82.

Each flange 74 and 76 includes a keyhole-shaped opening 84 including an opening portion 86 dimensioned to accommodate the head portion 56 of pin 50 or 52, i.e., the keyhole-shaped opening 84 includes an opening portion 86 having a diameter equal to or slightly greater than diameter d2 of a circular-shaped head portion 56, and a slot opening portion 88 dimensioned to accommodate the stem portion 54 of each respective pin 50 or 52, i.e., a width (w1) equal to or slightly greater than diameter d1 of the stem portion 54. In this manner, the bracket 64 can be slidingly engaged with the pins 50, 52 upon alignment and insertion of the head portions 54 of the pins 50, 52 into the respective opening portions 86 followed by sliding movement of the bracket 64 such that the stem portion 54 of each respective pin 50, 52 is slidingly engaged into a slot opening portion 88 of a respective flange 74 or 76. The flanges 74, 76 further includes a molded snap fit feature 90 overlying the opening portion 86 that is configured to upwardly flex upon insertion of the circular head portion 56 of a respective pin 50 or 52 into the keyhole-shaped opening 84.

Figure 7:
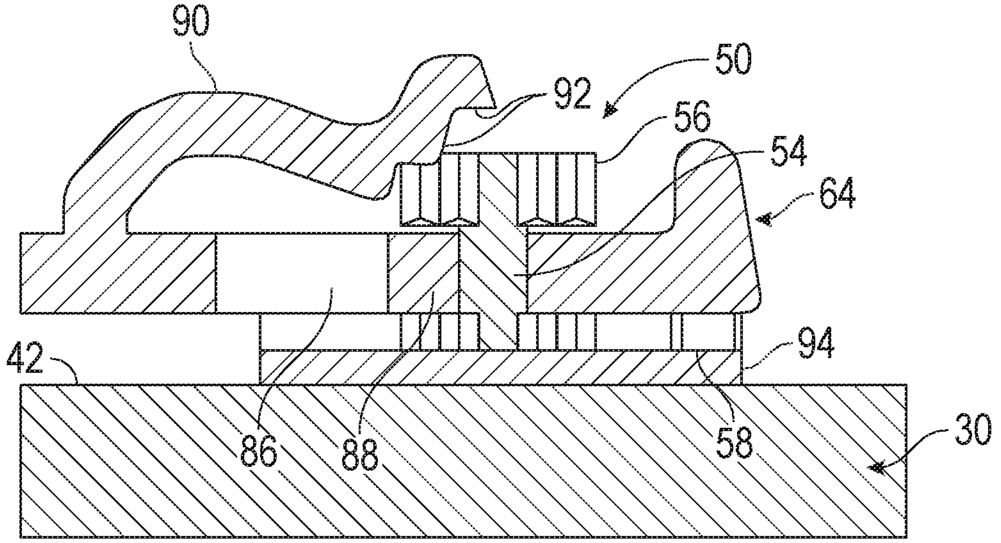
FIG. 7 is an enlarged sectional view of a release mechanism for the non-transparent display system taken along lines A-A of FIG. 3 releasably attached to a windshield assembly in accordance with one or more embodiments of the present disclosure.

FIG. 7 is an enlarged sectional view taken along lines A-A of FIG. 3 illustrating engagement of the bracket 64 with a respective pin, e.g., pin 50. As shown, the bottom surface 58 of pin 50 is adhesively bonded directly to the interior facing glass surface 42 of the windshield assembly 30 with an adhesive 94. The bracket 64 is slidingly engaged with pin 50 such that the stem portion 54 is positioned within the slot opening portion 88 as shown. The molded snap fit feature 90 includes a detent feature, e.g., notched end 92, that is configured to lockingly engage the circular head portion 56 of pin 50 once the bracket 64 is slidingly moved to a terminal end of the slot opening portion 88, which prevents lateral movement of the bracket 64 back towards the opening portion 86. To effect release of the bracket 64 from the pin 50, the molded snap fit feature 90 is manually lifted upwards relative to the respective flange 74 such that lateral movement within the slot opening portion 88 to the opening portion 86 is no longer prevented. In this manner, the non-transparent display system 60 can readily be serviced and/or replaced as desired.

Figure 8:
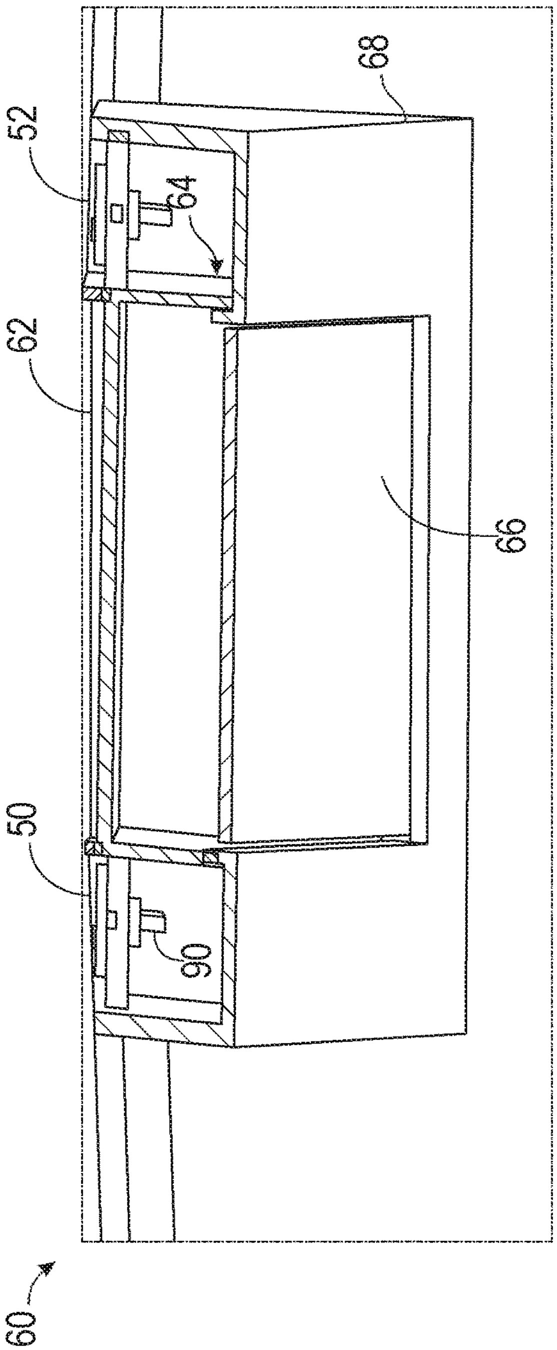
FIG. 8 is a top-down perspective view of the non-transparent display system releasably attached to a windshield assembly in accordance with one or more embodiments of the present disclosure.
Figure 9:
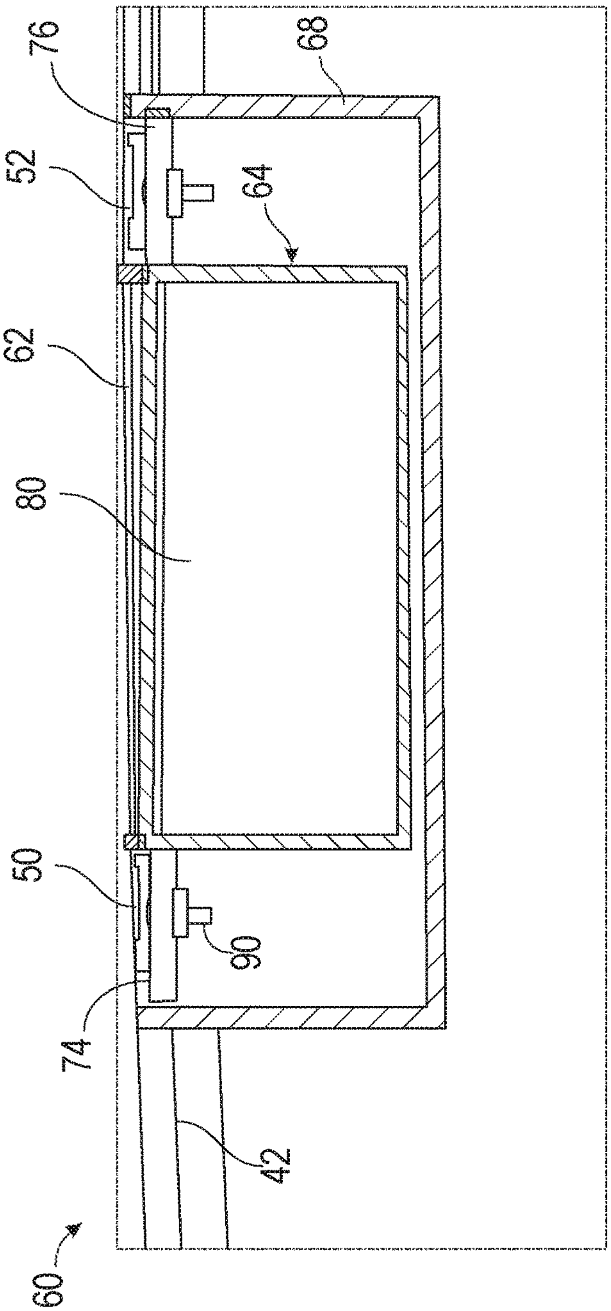
FIG. 9 is a bottom-up perspective view of the non-transparent display system releasably attached to a windshield assembly in accordance with one or more embodiments of the present disclosure.

FIGS. 8-9 illustrate top and bottom views of the non-transparent display system 60 releasably engaged with the pins 50, 52, which are adhesively bonded to the interior facing glass surface 42 of the windshield assembly 30 as described above.

Figure 10:
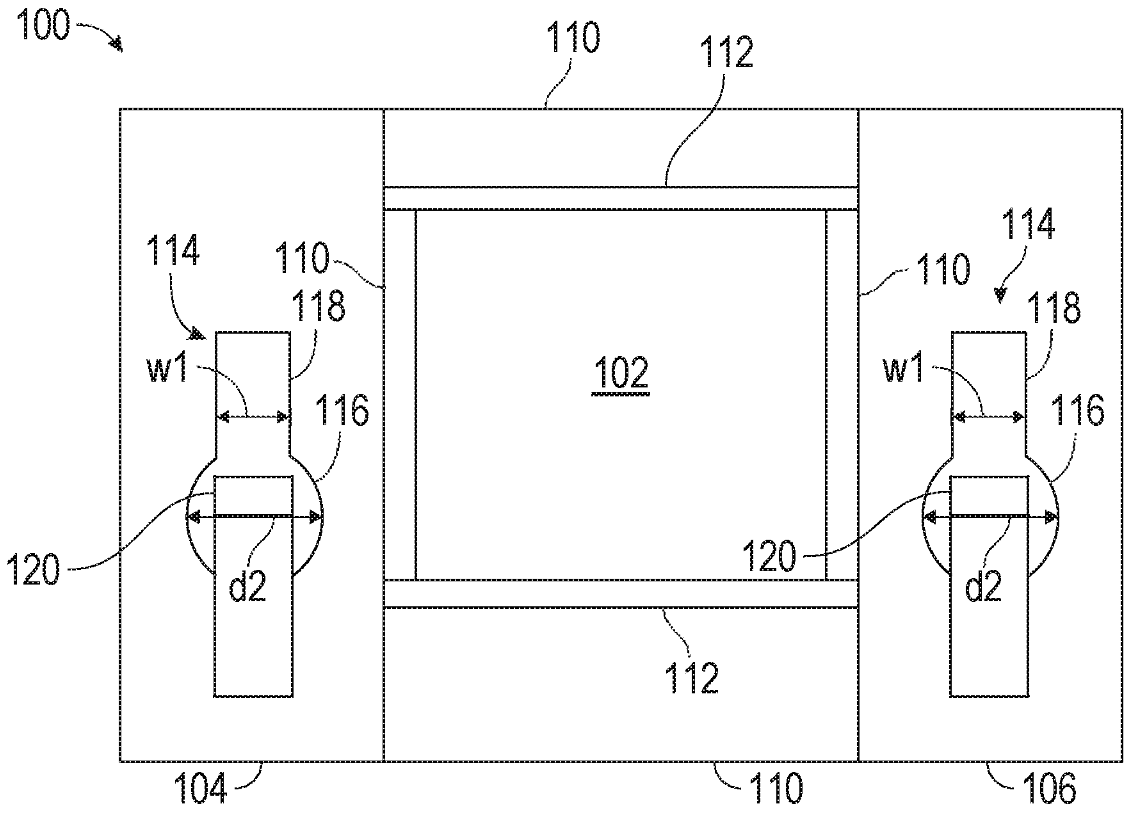
FIG. 10 is a front sectional view of a bracket for a transparent display system in accordance with one or more embodiments of the present disclosure.

FIG. 10 illustrates a front view of a bracket 100 suitable for use with a transparent display system. The transparent display system is substantially the same as that described above for the non-transparent display system 60 albeit the bracket 100 is modified to include a through-hole opening 102 and the display is a transparent display (not shown), which is mounted about a periphery of the opening 102. The bracket 100 includes first and second outwardly extending flanges 104, 106 having surfaces substantially coplanar to the interior facing glass surface 42 of the windshield assembly 30 when releasably attached to pins 50, 52 thereto. The flanges 104, 106 outwardly extend relative to sidewalls 110 perpendicularly extending from the flanges 104, 106. Cross members 112 transverse the sidewalls 110 to define the opening 102. The cross members 112 are raised relative to the flanges 104, 106. The cross members 112 can further include means for coupling the transparent display to the bracket 100.

Each flange 104 and 106 includes a keyhole-shaped opening 114 including an opening portion 116 dimensioned to accommodate the circular head portion 56 of pin 50 or 52, i.e., a diameter equal to or slightly greater than diameter d2 of the circular head portion 56, and a slot opening portion 118 dimensioned to accommodate the stem portion 54 of each respective pin 50 or 52, i.e., a width (w1) equal to or slightly greater than diameter d1 of the stem portion 54. In this manner, the bracket 100 can be slidingly engaged with the pins 50, 52 upon alignment and insertion of the circular head portions 54 of the pins 50, 52 into the respective opening portions 116 as previously described followed by sliding movement of the bracket 100 such that the stem portion 54 of each respective pin 50, 52 is slidingly engaged into the slot opening portion 118 of a respective flange 104 or 106. The flanges 104, 106 further includes molded snap fit features 120 overlying each opening portion 116 that are configured to upwardly flex upon insertion of the circular head portion 56 of a respective pin 50 or 52 into the keyhole-shaped opening 114 of bracket 100. The molded snap fit feature 120 further includes a notched free end (see notched free end 92 in FIG. 7) configured to lockingly engage the circular head portion 54 and provide a detent position when the bracket 100 is slidingly engaged such that the stem portion 54 of the respective pin 50, 52 abuts a terminal end of the bracket slot opening portion 118, which prevents lateral movement of the bracket 100 back towards the opening portions 116. To effect release of the bracket 100 from the pins 50, 52, the molded snap fit feature 120 is manually lifted upwards relative to the flanges 104, 106, respectively, such that lateral movement within the slot opening 118 to the opening portion 116 is no longer prevented. In this manner, the transparent display system can readily be serviced and/or replaced as desired.

Figure 11:
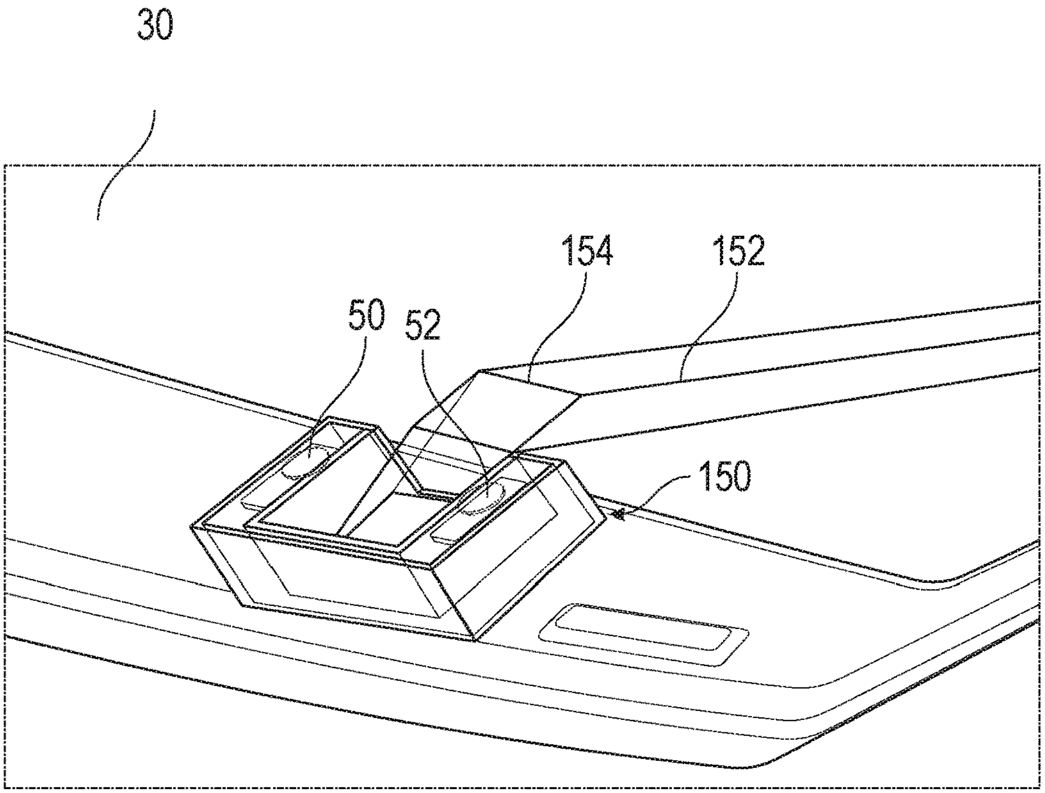
FIG. 11 is perspective exterior view of a heads-up display system releasably attached to a windshield assembly in accordance with one or more embodiments of the present disclosure.

FIGS. 11-14 illustrate various views of a heads-up display (HUD) system 150. FIG. 11 illustrates a partial top-down perspective view of the front windshield assembly 30 taken from the exterior of the vehicle depicting the HUD system 150 attached thereto via pins 50, 52, which is shown generally positioned above a dashboard 18, which is below the 5-degree downward line 152 extending forward from a driver eye reference geometry defined by the V points and E points according to the ECE Regulation No. 125. The HUD display system 150 is configured to project digital images 154 onto the interior facing surface 42 of the windshield assembly 30 in a manner generally known in the art. The interior facing surface 42 may include a reflective coating for displaying the digital images.

Figure 12:
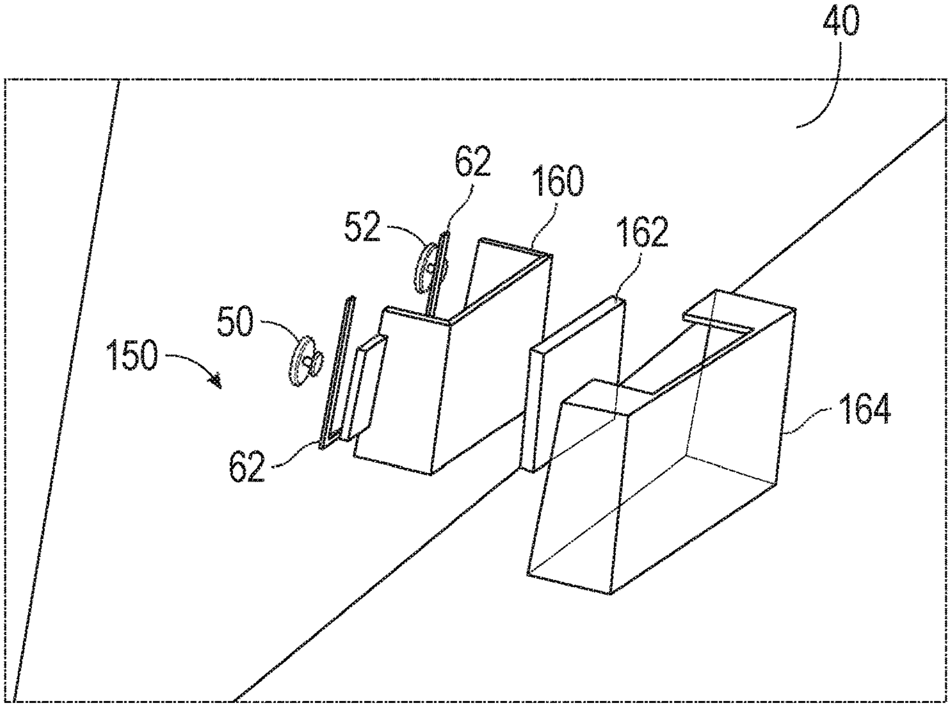
FIG. 12 is a disassembled perspective exterior view of the heads-up display system of FIG. 11 in accordance with one or more embodiments of the present disclosure.

In FIG. 12, a disassembled perspective view of the HUD system 150 is shown releasably coupled to the pair of spaced apart rigid pins 50, 52 adhesively bonded to the interior facing surface 42 of the windshield assembly 30, wherein the windshield assembly 30 further includes the rectangular shaped closeout 62 formed of a relatively soft thermoplastic elastomer formed on the interior facing surface 42 as previously described.

The HUD system 150 includes a bracket 160 for releasable engagement with the pins 50, 52, a heads-up display 162 mounted to the bracket 160 resulting in compression of at least 25 percent of a closeout 62, and a housing 164 overlying the bracket 160.

The bracket 160 is formed of a rigid plastic, which can be fiber reinforced, having a Shore hardness of about 75 A or greater. The housing 164 can be a thermoplastic olefin and is generally decorative. The housing 164 can be snap fit to the bracket 160 and readily removed as needed to provide access to the releasable mechanism for the bracket 160 as will be described in greater detail below. The housing 164 is generally seated but not attached to on a surface of the dashboard 18.

Figure 13:
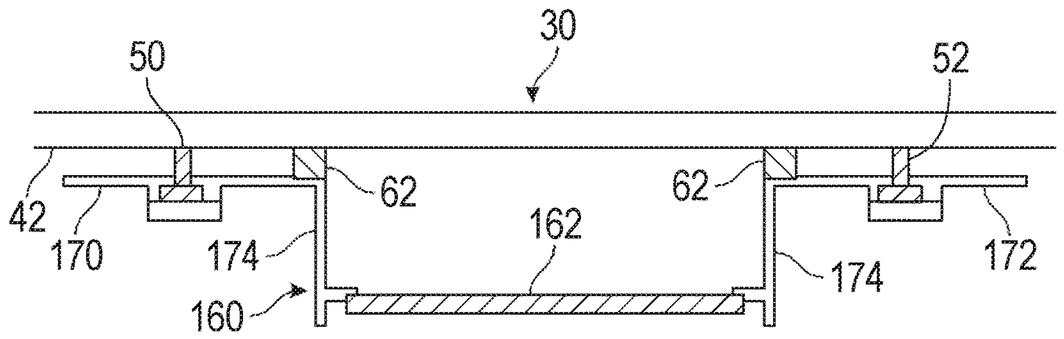
FIG. 13 is a top-down cross-sectional view of a bracket and heads-up display releasably attached to a windshield assembly in accordance with one or more embodiments of the present disclosure.
Figure 14:
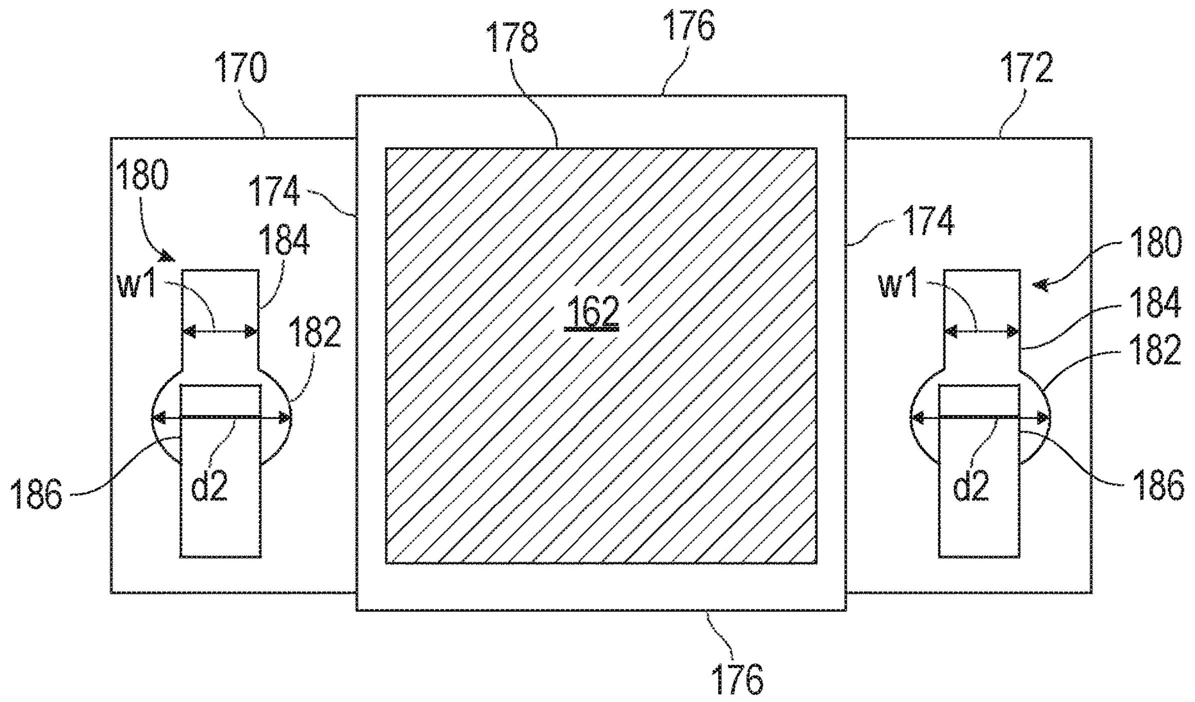
FIG. 14 is a front view of a bracket and heads-up display in accordance with one or more embodiments of the present disclosure.

In FIGS. 13-14, a top sectional view and a front sectional view of bracket 160 and heads up display 162, respectively, are shown. The bracket 160 includes first and second outwardly extending flanges 170, 172 including planar surfaces substantially coplanar to the interior facing surface 42 of the windshield assembly 30 when releasably attached thereto. Sidewalls 174 perpendicularly extend from each flange 170 and 172 such that the flanges 170, 172 outwardly extend relative to the sidewalls 174. Transverse cross members 176 are integrally joined to the sidewalls 174 to define an opening 178 in which the heads up display 162 is mounted. As shown more clearly in FIG. 13, the bracket 160 generally has a cross-sectional top-hat shape.

Each flange 170 and 172 includes a keyhole-shaped opening 180 including an opening portion 182 dimensioned to accommodate the circular head portion 56 of pin 50 or 52, i.e., a diameter equal to or slightly greater than diameter d2 of the circular head portion 56, and a slot opening portion 184 dimensioned to accommodate the stem portion 54 of each respective pin 50 or 52, i.e., a width (w1) equal to or slightly greater than diameter d1 of the stem portion 54. In this manner, the bracket 160 can be slidingly engaged with the pins 50, 52 adhesively bonded to the interior facing glass surface 42 upon alignment and insertion of the circular head portions 54 of the pins 50, 52 into the respective opening portions 182 followed by sliding movement of the bracket 160 such that the stem portion 54 of each respective pin 50, 52 is slidingly engaged into the slot opening 184 of a respective flange 170, 172. The bracket further includes molded snap fit feature 186 overlying the opening portion 182 such that the molded snap fit feature 186 upwardly flexes upon insertion of the circular head portion 56 of the pin 50 or 52 into the keyhole-shaped opening 180. The molded snap fit feature 186 further includes a notched free end as previously described (see FIG. 7) configured to lockingly engage the circular head portion 54 to prevent lateral movement of the bracket 160 back towards the opening portion 182. To effect release of the bracket 160 from the pins 50, 52, the molded snap fit features 186 can be manually lifted upwards relative to the flanges 170, 172, such that lateral movement is no longer prevented.

The HUD system 160 upon engagement of the bracket 160 with pins 50, 52 effectively compresses the closeout 62 on the interior facing glass surface 42 by at least 25 percent. The closeout 62 has a U-shape corresponding to the mating surfaces of the bracket 160 when engaged with the pins 50, 52.

A process of attaching the display systems described above to the windshield assembly 30 generally includes bonding metal or plastic bonded datum retention features such as the pins 50, 52 described above directly onto the interior facing glass surface 42 of the windshield assembly 30 and providing a compressible closeout complementary in shape to the contact surfaces of the bracket. The display system 12 is then removably attached to these retention features, wherein the display for the display system 12 can be injection molded with the releasable bracket for attachment to the retention features. The brackets are configured with locating datums for attachment to the closeout material and retention features and are releasably attached to the metal or plastic windshield retention features. As previously described, a softer thermoplastic elastomer is utilized as the closeout material to closeout access to the cavity space between the display and the windshield assembly. The bracket can be utilized to provide location of the soft sealing thermoplastic elastomer to the glass surface of the windshield assembly, which can accommodate glass thickness variation and provide effective closeout.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An automotive vehicle comprising:

a front windshield assembly comprising at least two spaced apart rigid pins adhesively bonded to an interior-facing curved glass surface, wherein each of the at least spaced apart rigid two pins comprises a bottom planar surface substantially coplanar with the interior facing glass surface, and a stem portion extending from the bottom planar surface to a terminal head portion, and wherein the interior-facing curved glass surface comprises a closeout that is injection molded on the interior-facing curved glass surface and the closeout is formed of a compressible thermoplastic elastomer; and a display system releasably attached to the interior facing glass surface comprising a display mounted to a rigid bracket, the rigid bracket comprising flanges extending outwardly relative to the mounted display on each side thereof, each of the flanges comprising a keyhole-shaped opening including an opening portion and a slot opening portion configured for sliding engagement and disengagement of the rigid bracket to the at least two spaced apart rigid pins, wherein the closeout compresses upon sliding engagement of the rigid bracket to the at least two spaced apart rigid pins to form a sealed cavity between the mounted display and the interior facing glass surface, wherein the closeout compresses at least 25 percent upon the sliding engagement of the rigid bracket.

2. The automotive vehicle of claim 1, wherein the closeout is formed of a thermoplastic elastomer having a Shore hardness equal to or less than about 50 and the rigid bracket is formed of a thermoplastic having a Shore hardness of equal to or greater than about 75.

3. The automotive vehicle of claim 1, wherein the sealed cavity prevents dust, debris, and moisture from entering the sealed cavity.

4. The automotive vehicle of claim 1, wherein the flanges comprise a molded snap fit feature including a flexible portion overlying the opening portion of the keyhole opening, wherein the flexible portion is configured to upwardly flex upon insertion of the terminal head portion of the pin, wherein the rigid bracket can be slidingly engaged with and lockingly engaged at a detent position at a terminal end of the slot opening portion and slidingly disengaged from the at least two pins upon upward flexure of the molded snap fit feature and sliding engagement of the rigid bracket away from the terminal end to the opening portion.

5. The automotive vehicle of claim 1, wherein the display mounted to the rigid bracket comprises a non-transparent display, a transparent display or a heads-up display.

6. The automotive vehicle of claim 1, wherein the opening portion and the slot opening portion of the keyhole-shaped opening have dimensions equal to or slightly larger than dimensions of the terminal head portion and the stem portion, respectively.

7. The automotive vehicle of claim 1, wherein the releasable display system is located below a 5-degree downward line extending forward from a driver eye reference geometry defined by V points and E points, wherein the V points are defined as points in a passenger compartment determined as a function of vertical longitudinal planes passing through centers of outermost designated front seating positions, and wherein the E points are defined as points representing centers of the driver's eyes.

8. The automotive vehicle of claim 1, wherein the releasable display system further comprises a decorative outer cover snap fit to the rigid bracket and overlying the rigid bracket in its entirety, the decorative outer cover including an opening for viewing the display mounted to the rigid bracket.

9. The automotive vehicle of claim 1, wherein each of the at least two spaced apart rigid pins is a monolithic structure formed of metal or plastic.

10. An automotive vehicle comprising:

a front windshield assembly comprising an exterior-facing curved glass surface and an interior-facing curved glass surface, wherein the interior-facing curved glass surface comprises at least two pins adhesively bonded to the interior-facing curved glass surface, wherein each of the at least two pins comprise a bottom planar surface coplanar with the interior facing glass surface, a stem portion extending from the bottom planar surface to a terminal head portion, and the interior-facing curved glass surface comprises a closeout that is injection molded on the interior facing glass surface and the closeout is formed of a compressible thermoplastic elastomer; and a display system releasably attached to the interior facing glass surface comprising a display mounted to a rigid bracket and a decorative housing overlying the rigid bracket in its entirety, the rigid bracket comprising flanges extending outwardly relative to the mounted display on each side thereof, the flanges comprising a keyhole-shaped opening including an opening portion configured to accommodate dimensions of the terminal head portion of the pin and a slot opening portion configured to accommodate dimensions of the stem portion, and a molded snap fit feature including a flexible portion overlying the opening portion configured to upwardly flex upon insertion of the terminal head portion of the pin, wherein the rigid bracket can be slidingly and lockingly engaged in the keyhole opening at a detent position at a terminal end of the slot opening portion, and wherein the rigid bracket can be slidingly disengaged from the at least two pins upon manual upward flexure of the molded snap fit feature and sliding engagement of the rigid bracket away from the terminal end to the opening portion, wherein the closeout compresses at least 25 percent upon the sliding engagement of the rigid bracket.

11. The automotive vehicle of claim 10, wherein the at least two pins function as datums for releasable attachment of the rigid bracket during assembly and for injection molding of the closeout onto the interior facing glass surface.

12. The automotive vehicle of claim 10, wherein the molded snap feature comprises a notched end configured to lockingly engage the terminal head portion at the detent position when the pin is at the terminal end of the slot opening portion.

13. The automotive vehicle of claim 10, wherein the display is raised relative to the flanges.

14. The automotive vehicle of claim 10, wherein the compressible thermoplastic elastomer comprises a Shore hardness equal to or less than 50 and the rigid bracket comprises a Shore hardness equal to or greater than about 75.

15. The automotive vehicle of claim 10, wherein the closeout and the rigid bracket have shapes effective to form a sealed cavity to prevent dust, debris and moisture from entering therein upon compressive engagement of the rigid bracket with the closeout.

16. The automotive vehicle of claim 15, wherein the rigid bracket comprises vents and the display is programmed to power on and release heat onto the interior facing glass surface about the display system upon detection of a condensation condition.

17. The automotive vehicle of claim 10, wherein the decorative housing overlying the rigid bracket is snap fit to the rigid bracket and is removable relative to the rigid bracket.

18. The automotive vehicle of claim 10, wherein the display system is located below a 5-degree downward line extending forward from a driver eye reference geometry defined by V points and E points, wherein the V points are defined as points in a passenger compartment determined as a function of vertical longitudinal planes passing through centers of outermost designated front seating positions, and wherein the E points are defined as points representing centers of the driver's eyes.

19. The automotive vehicle of claim 10, wherein each of the at least two pins is a monolithic structure formed of metal or plastic.

20. A process of releasably attaching a display system to a front windshield assembly comprises:

bonding at least two metal or plastic datum retention features onto an interior facing glass surface of the front windshield assembly, wherein the interior facing glass surface comprises a closeout that is injection molded on the interior-facing glass surface and the closeout is formed of a compressible thermoplastic elastomer;

releasably attaching the display system to the datum retention features, wherein the display system comprises a rigid bracket comprising flanges outwardly extending on each side of a display mounted to the rigid bracket, each of the flanges comprising a keyhole-shaped opening including an opening portion, a slot opening portion, and a molded snap fit feature overlying the opening portion, wherein the attaching of the display system comprises lockingly engaging the datum retention features at a detent position at a terminal end of the slot opening portion upon engagement with the molded snap fit feature and wherein the closeout compresses upon sliding engagement of the rigid bracket to form a sealed cavity between the display and the interior facing glass surface, and wherein the closeout compresses at least 25 percent upon the sliding engagement of the rigid bracket; and releasing the display system comprises upward flexure of the molded snap fit feature and sliding engagement of the rigid bracket away from the terminal end of the slot opening portion to the opening portion, wherein the rigid bracket can be completely disengaged from the datum retention features.

* * * * *